United States Patent
Decrooix et al.

(10) Patent No.: US 8,073,569 B2
(45) Date of Patent: Dec. 6, 2011

(54) METHOD OF CONFIGURING A SYSTEM FOR DRIVING A SCREEN FOR CLOSURE, SUN PROTECTION, OR PROJECTION PURPOSES

(75) Inventors: Christophe Decrooix, La Roche sur Foron (FR); Valerie Bourgeois, La Balme de Sillingy (FR); Laurent Pillon, Bonneville (FR); David Scrivo, La Roche sur Foron (FR)

(73) Assignee: Somfy SAS, Cluses (FR)

( * ) Notice: Subject to any disclaimer, the term of this patent is extended or adjusted under 35 U.S.C. 154(b) by 632 days.

(21) Appl. No.: 12/213,674

(22) Filed: Jun. 23, 2008

(65) Prior Publication Data

US 2009/0005911 A1   Jan. 1, 2009

(30) Foreign Application Priority Data

Jun. 27, 2007  (FR) .................................. 07 04622

(51) Int. Cl.
  *G05B 19/00* (2006.01)
  *E05F 15/16* (2006.01)
(52) U.S. Cl. .................. 700/275; 160/188; 318/445
(58) Field of Classification Search .................. 700/275; 160/188, 405; 318/266, 282, 445, 446, 466
See application file for complete search history.

(56) References Cited

U.S. PATENT DOCUMENTS

| 4,464,651 | A | * | 8/1984 | Duhame | 318/565 |
| 4,638,433 | A | * | 1/1987 | Schindler | 318/266 |
| 4,665,965 | A | * | 5/1987 | Pasquier et al. | 160/310 |
| 4,929,877 | A | * | 5/1990 | Clark et al. | 318/467 |
| 5,751,224 | A | * | 5/1998 | Fitzgibbon | 160/188 |
| 6,100,659 | A | * | 8/2000 | Will et al. | 318/466 |
| 6,107,765 | A | * | 8/2000 | Fitzgibbon et al. | 318/266 |
| 7,034,485 | B2 | * | 4/2006 | Kuan et al. | 318/466 |
| 7,038,409 | B1 | * | 5/2006 | Mullet | 318/466 |

FOREIGN PATENT DOCUMENTS

| EP | 0 426 577 A | 5/1991 |
| EP | 0 718 729 A | 6/1996 |
| FR | 2 882 843 A | 9/2006 |
| WO | WO 00/49262 | 8/2000 |
| WO | WO-2006/092695 | 8/2000 |

* cited by examiner

*Primary Examiner* — Charles Kasenge
(74) *Attorney, Agent, or Firm* — Dowell & Dowell, PC

(57) ABSTRACT

The method of switching an electronic unit of a movable screen for closures, sun protection devices and the like to a training mode on the basis of a predetermined series of control signals received from a control member, the series of signals being the result of executing a predetermined press sequence on at least one button of the control member. When the predetermined press sequence is executed, the electronic unit changes a state of an actuator for moving the screen as a function of at least one signal received from the control member, thus enabling the user to perceive that the predetermined press sequence has been recognized.

17 Claims, 3 Drawing Sheets

METHOD OF CONFIGURING A SYSTEM FOR DRIVING A SCREEN FOR CLOSURE, SUN PROTECTION, OR PROJECTION PURPOSES

BACKGROUND OF THE INVENTION

1. Field of the Invention

The invention relates to a method of configuring a system comprising a moving screen of the type comprising a roller blind, shutter, garage door, projection screen, or analogous element that is driven by an actuator. Such an actuator generally comprises an electric motor powered under the control of an electronic unit. The electronic unit interacts with a control member that may be fixed, in which case control takes place in a wired mode, or portable, in which case control take place by radio or infrared. Such a control member is sometimes referred to as a "control point". When control takes place over wires, it is often referred to as a "control box", whereas when control takes place by radio or infrared, reference is often made to a "remote control". Thus, actuating a button of the control member causes the actuator to execute an order. One button may cause the actuator to move in one direction, and another button may cause it to move in the opposite direction.

2. Brief Description of the Related Art

For reasons of comfort and/or safety, that type of system enables the opening of the screen to be controlled automatically. It is then necessary to program the stroke of the screen, and in particular its high and low end-of-stroke positions. Some actuators manage screen positioning by an electronic unit counting the number of revolutions performed and/or detecting a threshold motor torque, for example. Under such circumstances, a training stage is needed during which the electronic unit switches over to a mode that enables the parameters of the system to be defined. Those parameters identify the high and/or low end-of-stroke positions.

To switch over to training mode, a first solution consists in varying the power supply to the electronic unit, e.g. switching it off twice in succession within a determined period of time. That solution is not practical if a plurality of actuators share the same power supply and if it is not desired that all of them should switch over to training mode together. It is also known, for the same purpose, to connect a shunt between two phases of the motor for a determined duration. The shunt may be obtained by a special adjustment tool or by physically connecting together two terminals on the electronic card of the control point via a metal component. That solution requires a suitable tool to be used and requires the system to be dismantled in order to make the shunt connection.

In another approach, it is possible to press simultaneously on two of the buttons of the control member, for example the up and the down buttons, or the stop and the programming buttons. In itself, that operation does not cause the screen to move at all. It is then not clear whether the operation has been carried out properly. Furthermore, certain control members do not enable two buttons to be activated simultaneously or do not have a stop button or a program button. This is true in particular when renovating a system in which it is not necessarily desirable to change the control member(s) and/or to rewire the installation.

To solve this problem, WO-A-00/49262 describes a configuration method and system using control members having two buttons: on and off. To cause an electronic unit controlling an actuator to switch over to training mode, a sequence of button presses must be executed, each button needing to be pressed in a determined time. If the sequence is achieved, then the electronic unit switches over to training mode. With such a method and such a system, the order transmitted by a control member is always executed after a time delay in order to verify whether or not the user is beginning a sequence of presses for switching over to training mode. This time delay is undesirable in normal operation. Furthermore, it is not obvious how to tell whether the switchover to training mode had indeed taken place, since no movement results between the successive button presses.

EP-A-0 718 729 discloses causing a roller blind to perform a predetermined movement, such as down a little and then up, after a user has fully executed an operation seeking to cause the blind to switch over into programming mode. It is only after a processor unit has entered programming mode that the above-mentioned movement of the blind takes place, so that while entering a programming order, the user cannot be certain that the order is indeed correct. Furthermore, the panel moving down a little and then up is not necessarily representative of the programming order, which can lead to a certain amount of confusion for the user.

SUMMARY OF THE INVENTION

The invention provides a configuration for such a system that enables the above-mentioned drawbacks to be mitigated.

To this end, the invention relates to a method of configuring a system for driving a screen for closure, sun protection, or projection purposes, the system comprising: an actuator for driving the screen; at least one control member provided with at least one button; and an electronic unit suitable for controlling the actuator as a function of a control signal received from the control member; the method comprising a step of switching the electronic unit over to a training mode, on the basis of a predetermined series of control signals received by the control member, said series of signals being the result of executing a predetermined press sequence on at least one button of the control member. This method is characterized in that during execution of the predetermined press sequence, the electronic unit changes the state of the actuator as a function of each signal received from the control member.

By means of the invention, in order to cause the electronic unit to switch over to training mode, the user needs to execute a specific sequence of button presses on the control point. In the description below, the user may be a professional installer of a system that includes a moving screen, or any other person involved in adjusting such a system, including the end user. During this operation, each button activation causes the actuator to execute an order that gives rise to the actuator moving or ceasing to move, i.e. to it changing its state. In this way, the user can visually verify that the specific sequence is being performed by observing the movements and the stops of the screen, without it being necessary to wait until the predetermined press sequence has been fully executed. If the user makes a mistake while pressing the buttons, then this is obvious immediately, without it being necessary to wait in vain for the electronic unit to switch over to training mode. The user is thus informed in real time that the press sequence is being performed properly and that the electronic unit is going to switch over to training mode. In addition, since the state of the actuator is changed by the electronic unit as a function of the received signal, the movements of the screen can be representative of the press sequence implemented by the user, thus making visual checking easier compared with the configuration in which the movement performed by the screen is always the same.

Advantageously, during execution of the predetermined sequence, a press on a button of the control member causes the electronic unit to change the state of the actuator in the same manner as when the control member is used for controlling the drive system in normal operation. This makes it easier for the user to check visually while performing the predetermined press sequence.

In addition, the predetermined press sequence on the button(s) of the control member does not cause the screen to reach a particular position prior to switching over the electronic unit to training mode. As a result, the configuration operation is simple. The electronic unit can be caused to switch over to training regardless of the position of the screen.

When the control member is provided with a plurality of buttons, at least one signal resulting from pressing on one of its buttons during the predetermined sequence cannot not be taken into account by the electronic unit as forming part of the predetermined series of control signals that gives rise to the electronic unit switching over to training mode. A system having a plurality of control points that are not necessarily operated in the same way and that do not necessarily have the same number of buttons can thus have a uniform procedure for switching over to training mode.

The method of the invention may comprise the following successive steps:
  a) the electronic unit processes signals received from at least one control member and causes the actuator to execute an order associated with an activated button;
  b) the electronic unit identifies the initial button of the predetermined press sequence; and
  c) the electronic unit compares the activated button with the initial button.

Advantageously, the electronic unit switches over to training mode when the result of the comparison in step c) is positive and once complete execution of the predetermined press sequence has been detected by the electronic unit.

If the result of the comparison in step c) is positive, the method may also comprise the following successive steps:
  e) the electronic unit accesses a memory storing information relating to the predetermined press sequence;
  f) the electronic unit identifies the following button to be activated in the predetermined press sequence;
  g) on receiving a signal, the electronic unit causes the actuator to execute an order associated with the button that corresponds to the received signal on being activated;
  h) the electronic unit compares the activated button with the following button; and
  i) if the result of the comparison in step h) is positive, the electronic unit compares whether the following button identified during step f) matches the final button of the predetermined press sequence;
  with steps e) and f) being reproduced so long as the result of the comparison in step h) is positive and the result of the comparison in step i) is negative;
  and the electronic unit switches over to training mode when the result of the comparison of step i) is positive.

In addition, if the result of the comparison in one of steps c) or h) is negative, provision can be made for the electronic unit to pass to a waiting state from which it executes steps a) to c) on receiving a signal from a control member.

To avoid the user performing involuntary operations, it may be necessary for the specific sequence to be executed within a limited time period. Switching over to training mode thus depends on the specific press sequence being performed in a determined time period. For this purpose, the method comprises a step for verifying whether the duration of the execution of the predetermined press sequence is less than a threshold value, and if the result of this verification is negative, then the electronic unit passes to a waiting state from which it executes steps a) to c) on receiving a signal from a control member.

Alternatively, in order to reduce the risk of an involuntary switchover, the specific sequence may incorporate durations for which it is necessary to hold down the press buttons. Under such circumstances, the method comprises a step of verifying whether the duration of a button activation during the predetermined press sequence has a value greater than a first threshold value and less than a second threshold value, and if the result of this verification is negative, then the electronic unit passes to a waiting state from which it executes steps a) to c) on receiving a signal from a control member.

In addition to direct visual verification when executing the specific sequence, provision can be made for configuration information to be returned indicating that switchover to training mode has indeed taken place, i.e. that the step of the electronic unit switching over to training mode has indeed occurred. The user can then be sure that the system has switched over to training mode.

The specific sequence may be defined while in training mode, by a particular run of button presses. The user can thus personalize this sequence.

BRIEF DESCRIPTION OF THE DRAWINGS

The invention can be better understood on reading the following description given purely by way of example and made with reference to the accompanying drawings, in which.

DESCRIPTION OF THE PREFERRED EMBODIMENT

Figure 1:
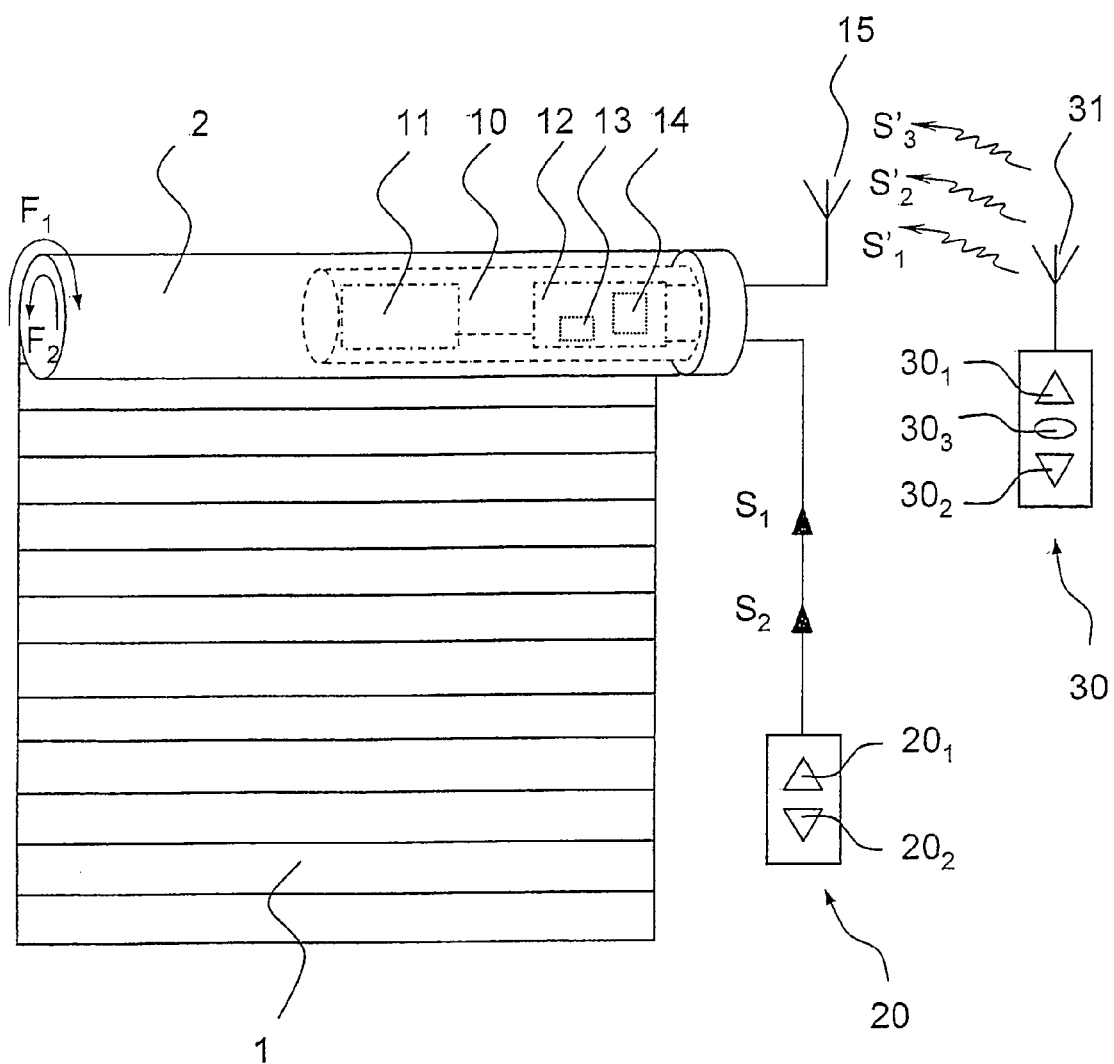
FIG. 1 is a diagrammatic view of a drive system with which the invention can be implemented.

FIG. 1 shows a tubular actuator 10 for driving a winder tube 2 on which at least one panel or screen 1 can be wound. The actuator 10 comprises an electric motor and gearbox assembly 11 connected to the winder tube via a connection that is not shown, and an electronic unit 12 controlling the power supply to the motor 11. The electronic unit also incorporates a module 13 for detecting the ends of strokes of the panel, i.e. for detecting when the panel reaches determined positions. End-of-stroke detection can be obtained by various means such as detecting overtorque j measuring time, or counting a number of revolutions.

The electronic unit 12 is controlled by a wired control box 20 and by a portable remote control 30. The communications means shown for the remote control is radio via antennas 15 and 31. It would also be possible to use infrared communication between the remote control 30 and the unit 12. The unit 12 could be controlled by only one member, i.e. only the box 20 or only the remote control 30.

The control members 20 and 30 are provided with buttons $20_1$, $20_2$, $30_1$, $30_2$, $30_3$. When one of these buttons is pressed, an order is transmitted to the unit 12 and, from there, to the actuator 10.

To raise the panel 1 it suffices to press on one of the up buttons $20_1$ or $30_1$. When the button $20_1$ is activated, the electronic unit 12 receives a signal $S_1$ via a line $L_1$ providing an electrical connection between the box 20 and the unit 12. The unit 12 then processes the signal $S_1$ in order to power the motor 11 in such a manner as to implement the desired movement of the actuator. When the remote control button $30_1$ is activated, the antenna 31 transmits a radio signal $S'_1$ that is received by the antenna 15 and processed by the unit 12 like the signal $S_1$. In the present example, when the user presses on one of the up buttons $20_1$ or $30_1$, the motor 11 is powered by the unit 12 so as to drive the winder tube 2 in the direction of arrow $F_1$, so that the panel 1 is then wound around the button tube 2.

To issue a down instruction, the buttons to be activated are the buttons $20_2$ and $30_2$, thereby causing down order signals $S_2$ or $S'_2$ to be sent to the unit 12, either over the line $L_1$ or by radio. The actuator 10 is then controlled by the unit 12 to turn the tube in the direction of arrow $F_2$, thereby causing the panel 1 to be lowered.

To stop the movement, if the control member is fitted with a stop button, as is the remote control 30 with its button $30_3$, it suffices to activate this button to transmit a stop signal $S'_3$ which is processed by the unit 12 to cease powering the motor 11.

With a more basic control member, movement can be stopped differently. In a first configuration, the up or down movement of the actuator is obtained so long as the up button $20_1$ or the down button $20_2$ is pressed. Thus, as soon as the button is released, the screen 1 stops. In a second configuration, stopping is obtained by pressing on the button that corresponds to moving in the opposite direction. If the up button $20_1$ or the down button $20_2$ is pressed, that button remains active until it is deactivated by the user pressing on the other button, i.e. the down button $20_2$ or the up button $20_1$.

In order to adjust the ends of the strokes, the electronic unit 12 needs to be switched into training mode. This change of mode is made possible when a specific or predetermined sequence of presses is applied to the control member 20 or 30. This sequence is not necessarily exclusive, so it is possible for the electronic unit to respond to a plurality of specific sequences, or to some other means for causing it to switch over. Thus, for example, the electronic unit switches over to training mode if a first specific sequence is reproduced, or if a second specific sequence is reproduced, or if a programming button on the control member is pressed.

In the description below, the predetermined sequence $S_{prog}$ is said to be "specific" in the sense that it relates to a sequence of presses on the buttons suitable for causing the unit 12 to switch over to training mode. Informations relating to the specific sequence of presses to be performed in order to switch the unit 12 into training mode is stored in a memory 14 of the electronic unit 12. For convenience of description, it is assumed below that the specific sequence of presses $S_{prog}$ is stored in the memory 14. However, it is preferable for the specific sequence to be implanted in the program of a microcontroller that is mounted instead of the memory 14 and that has the function of controlling the actuator 10. The description below refers to the memory 14, but it should be understood that it could equally well refer to such a microcontroller. The electronic unit compares the signals it receives from the control member 20 or 30 with the sequence stored in its memory 14. If the sequences match, then the unit switches over to training mode, otherwise it remains in utilization mode.

In the example shown, the electronic unit 12 is situated in the actuator 10, however it could very well be situated outside the actuator, e.g. in the control member 20 or 30.

Figure 2:
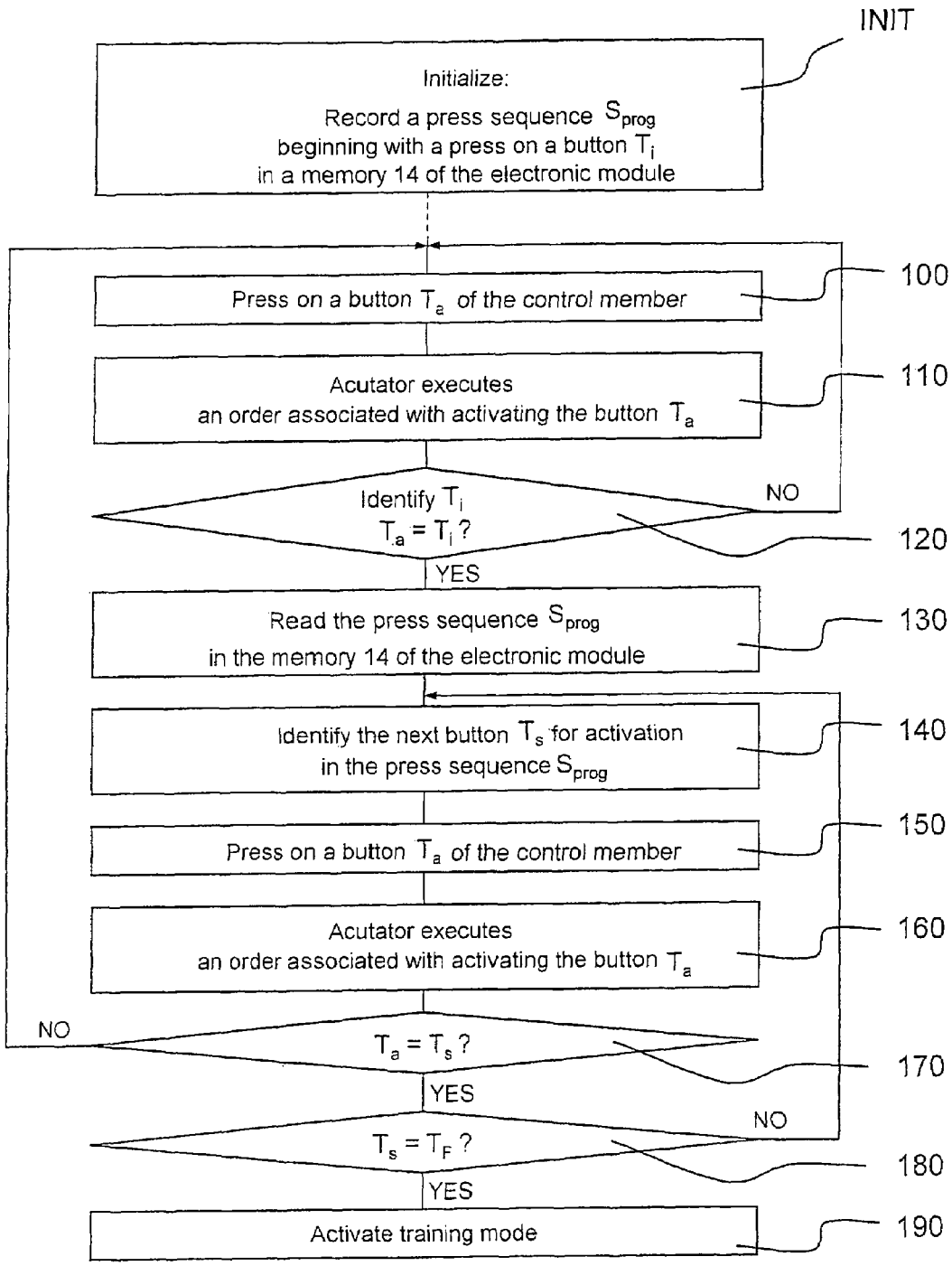
FIG. 2 is flow chart showing a configuration method of the invention.

FIG. 2 shows a configuration method enabling switchover of the unit 12 into training mode to be activated.

An initialization step INIT enables the specific sequence $S_{prog}$ of presses on the buttons to be stored or recorded in the memory 14 of the electronic unit. This recording stage may be performed by the manufacturer of the actuator 10 at the site of production. The specific sequence may also be defined directly in the program. It is therefore not necessarily configurable.

The specific sequence comprises a first button $T_i$ to be activated. To illustrate the method, the following sequence $S_{prog}$ has been selected: one pulse on the up button of the control member 20 or 30, one pulse on the down button, and one pulse on the up button. $T_i$ thus corresponds to the up button $20_1$ or $30_1$. Each pulse on a button causes a signal $S_1$, $S_2$, $S'_1$, $S'_2$ or $S'_3$ to be sent to the electronic unit 12. The specific sequence can thus be considered in terms of signals received. In the present example, it may be $S_1$, $S_2$, $S'_1$, or $S'_1$, $S'_2$, $S'_1$, or a mixture of the signals. For convenience the sequence is described in terms of the buttons pressed, even if it is the signal that serves to identify execution of the sequence.

In a first step 100, the user presses on a button $T_a$ of a control member.

In a second step 110, the unit 12 processes the signal $S_1$, $S_2$, $S'_1$, $S'_2$, or $S'_3$ received from the control member 20 or 30 and corresponding to the button $T_a$ so as to cause the actuator 10 to execute the order associated with the button $T_a$. For example if $T_a$ is an up button $20_1$ or $30_1$, then the actuator 10 is controlled by the unit 12 so that the tube 2 turns in the direction for winding up the panel 1, in the direction of arrow $F_1$.

In a third step 120, the electronic unit 12 identifies in its memory 14 which button $T_i$ initializes the specific sequence $S_{prog}$, and then it determines whether the button $T_a$ that has been activated corresponds to the initial button $T_i$. If so, the method moves onto a fourth step 130. Otherwise, the method reinitializes and the unit 12 waits for a new step 100 to occur. In the present example, pressing the up button serves to move on to step 130.

Identifying button $T_i$ and comparing it with buttons $T_a$ and $T_i$, as performed in step 120, could also be performed in two distinct steps.

During step 130, the electronic unit 12 reads the specific sequence $S_{prog}$ stored in the memory 14.

In a fifth step 140, following step 130, the electronic unit identifies the following button $T_s$ that needs to be executed if the specific sequence $S_{prog}$ is reproduced. The following button $T_s$ is the button that comes after the previously-activated button $T_a$ in the specific sequence as recorded. In the present example, the button $T_a$ activated in step 110 corresponds to the initial button $T_i$, i.e. the up button. The following button $T_s$ is thus the second button for activating in the sequence $S_{prog}$, i.e. the down button.

In a sixth step 150, the user presses on a new button $T_a$.

In a seventh step 160, the unit 12 processes the signal received from the control member in order to cause the actuator to execute the order associated with the button $T_a$. For example, if $T_a$ is the down button, the tube 2 is driven in the direction for lowering the panel 1.

In an eighth step 170, the electronic unit verifies whether the button $T_a$ that has been activated corresponds to the following button $T_s$ as identified in step 140. If so, the method moves onto a step 180. Otherwise, the method reinitializes and the unit 12 waits for a new step 100 to occur.

In a ninth step 180, the electronic unit identifies whether the following button $T_s$ identified in step 140 constitutes the last button $T_F$ of the sequence $S_{prog}$. In other words, the unit 12 verifies whether there remains another button to be activated after the action in step 150 in order to comply with the specific sequence $S_{prog}$ as recorded. If so, the method moves onto a tenth step 190. Otherwise, method returns to step 140.

In the above-mentioned example, the user has pressed once on the up button and once on the down button. It now remains to press once more on the up button in order to terminate the specific sequence. The method thus moves to step 140. During step 140, $T_s$ now corresponds to the up button. If in step 150 the user does indeed activate the up button, then the sequence $S_{prog}$ will have been reproduced in full, and the unit will move on to step 190 after step 180. In this tenth step 190, the electronic unit switches over to training mode.

In a variant of the above-described method, step 130 may precede step 120. If so, the button $T_i$ will be identified during step 130 and step 120 will merely comprise verifying that $T_a$ and $T_i$ match.

The orders executed by the actuator 10 during steps 110 and 160 correspond to orders for changing the state of the actuator. If the motor was stopped, a change of state is causing the actuator to move. If the motor was moving, a change of state is stopping it or causing it to move in the opposite direction. When the movement of the actuator continues so long as the button on the control point is activated, releasing the button and pressing again on the same button causes a change in the state of the actuator. This is because the motor stops when the button is released.

Provision can also be made for the specific sequence $S_{prog}$ to comprise only orders that cause the actuator to move. A stop order is then not taken into consideration.

In analogous manner, another implementation consists in not taking into consideration the activation of certain buttons. For example, $S_{prog}$ may correspond to three pulses on the up button. The stop button can then be ignored. Under such circumstances, the sequence: up/stop/up/stop/up reproduces the recorded sequence $S_{prog}$. The electronic unit 12 then switches over to training mode on receiving this sequence.

In all of its variants, the method of the invention is independent of the position of the screen 1. It is therefore not necessary for the screen to be taken to or to pass through any particular position for the unit 12 to switch into training mode in step 190.

Preferably, the method incorporates a time delay making it possible to define a period during which the specific sequence must be executed. By way of example, the sequence must be reproduced within less than 6 seconds. This variant is shown in FIG. 3.

Figure 3:
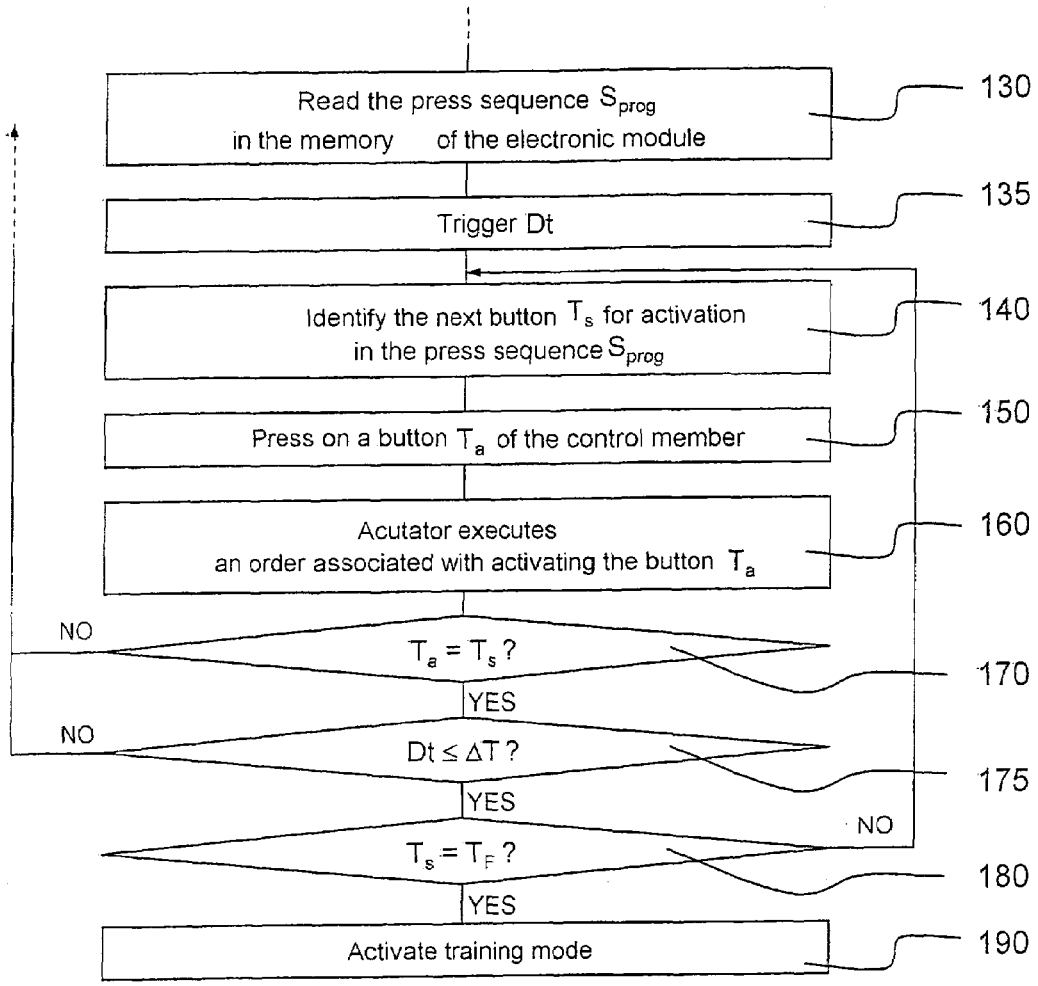
FIG. 3 is a fragment of a flow chart showing a variant of the FIG. 2 flow chart in which a first additional function is introduced.

In the variant of FIG. 3, a step 135, after the step 130 and before the step 140, serves to enable the electronic unit 12 to trigger a time count Dt. In a later step 175, after the step 170 and before the step 180, a comparison is performed to see whether the button $T_s$ of the specific sequence was activated in step 160 before the end of a predetermined period ΔT, equal to 6 seconds in this example. If so, the method moves on to a step 180. Otherwise, the method reinitializes and the unit 12 waits for a new step 100 to occur.

In a variant, the step 175 may be shifted to between the steps 180 and 190. Under such circumstances, verification that the sequence $S_{prog}$ has indeed been performed within the prescribed period is performed solely at the end of the sequence.

It is also possible to insert a comparison identical to that of step 175 during a step that occurs after step 140 and before step 150, having consequences analogous to those of step 175.

In a variant, it is also possible to use a time delay to verify that the execution of the specific sequence has a duration that is greater than a predetermined value, e.g. equal to four seconds. Under such circumstances, the specific sequence must be performed over a duration lying in the range 4 seconds to 6 seconds.

Another implementation consists in integrating in the specific sequence, durations for holding down the buttons in the sequence to be reproduced. For example, when the specific sequence $S_{prog}$ is constituted by three successive presses for which each press needs to be performed in a time range lying between 100 milliseconds (ms) and 1 second (s), if the button is pressed once for a longer period, i.e. for more than one second, then the sequence has not been reproduced correctly and training mode is not activated. The unit 12 waits for a new step 100 to occur. In another approach, the verification steps 120 and 170 include verification that the duration for which the button $T_a$ is activated corresponds to a predetermined time interval, i.e. 100 ms to 1 s in this example. Generally, this constraint suffices to protect against fortuitous execution of the specific sequence in normal operation. For energy saving reasons, it is possible to take account solely of the duration for which a button is pressed in the specific sequence and not to take account of the total duration of the sequence. If the total duration of the sequence is taken into account, it is then necessary to power the control unit during periods when no buttons are pressed, so as to continue measuring time lapses, and that increases energy consumption.

Figure 4:
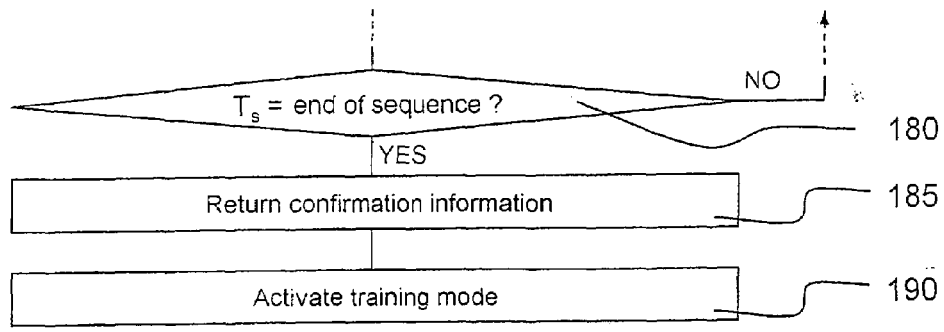
FIG. 4 is another fragment of a flow chart for another variant of the FIG. 2 flow chart, in which a second additional function is introduced.

At the end of the method, as shown in FIG. 4, information can be returned in a step 185 in order to confirm to the user that the unit 12 has indeed switched over to training mode in step 190. This return of information may be a specific movement of the screen, e.g. an up and down movement, switching on an indicator light, or momentarily activating a buzzer.

The specific sequence $S_{prog}$ may be modified by the manufacturer, the installer, or the user after the actuator 10 has left the factory. To do this, a new predetermined sequence $S'_{prog}$ can be recorded following a specific programming operation, by activating the buttons with a selected sequence, while the electronic unit is already in training mode. The new sequence is then executed and recorded simultaneously in the memory 14 of the electronic unit.

The training mode of the unit 12 is not limited to adjusting the ends of strokes. Other parameters may also be adjusted in this mode.

The invention is described for use in controlling a roller blind. It can also be applied to controlling a shutter, and more generally any home automation screen for closure, sun protection, or projection purposes.

The technical characteristics of the various implementations described can be combined with one another within the ambit of the invention.

The invention claimed is:

1. A method of configuring a system for driving a screen for a closure, sun protection, or projection purposes, wherein the system includes:
   an actuator for driving the screen;
   at least one control member provided with at least one button; and
   an electronic unit for controlling the actuator as a function of a control signal received from the control member upon pressing of the at least one button;

the method comprising a step of switching the electronic unit to a training mode, on the basis of a series of control signals received by the at least one control member, said series of signals being the result of executing a predetermined press sequence on the at least one button of the at least one control member;

the method further comprising the successive steps of a) the electronic unit processing signals received from the at least one control member and causing the actuator to execute an order associated with a press on the at least one button;

b) the electronic unit identifying an initial button of the predetermined press sequence; and c) the electronic unit comparing the pressed button with the initial button;

the electronic unit switching to the training mode when the result of the comparison in step c) is positive and once complete execution of the predetermined press sequence has been detected by the electronic unit; and wherein, during execution of the predetermined press sequence, the electronic unit causes the actuator to start a movement or to cease to move as a function of at least one signal received from the at least one control member.

2. The method according to claim 1, wherein, during execution of the predetermined press sequence, a press on the at least one button of the at least one control member causes the electronic unit to change the state of the actuator in the same manner as when the at least one control member is used for controlling the drive system in a normal operation.

3. The method according to claim 1, wherein the predetermined press sequence on the at least one button of the at least one control member does not cause the screen to reach a particular position prior to switching the electronic unit to the training mode.

4. The method according to claim 1, wherein when the at least one control member is provided with a plurality of buttons, at least one signal resulting from pressing on one of the buttons during the predetermined press sequence is not taken into account by the electronic unit as forming part of the series of control signals giving rise to the electronic unit switching to the training mode.

5. The method according to claim 1, including a step for verifying whether a duration of the execution of the predetermined press sequence is less than a threshold value, and if the result of the verification is negative, then the electronic unit passes to a waiting state from which it executes steps a) to c) on receiving a signal from the at least one control member.

6. The method according to claim 1, including a step of verifying whether a duration of a button pressing during the predetermined press sequence has a value greater than a first threshold value and less than a second threshold value, and if the result of the verification is negative, then the electronic unit passes to a waiting state from which it executes steps a) to c) on receiving a signal from the at least one control member.

7. The method according to claim 1, wherein, when the electronic unit switches to training mode, return information is sent to a user in visual or audible form.

8. The method according to claim 1, wherein, when the electronic unit has switched to training mode, recording a predetermined press sequence, enabling the electronic unit subsequently to switch to the training mode, the recorded predetermined press sequence being recorded by activating the at least one button of the at least one control member.

9. A method of configuring a system for driving a screen for a closure, sun protection, or projection purposes, wherein the system includes:

an actuator for driving the screen;

at least one control member provided with at least one button; and an electronic unit for controlling the actuator as a function of a control signal received from the control member upon pressing of the at least one button;

the method comprising a step of switching the electronic unit to a training mode, on the basis of a series of control signals received by the at least one control member, said series of signals being the result of executing a predetermined press sequence on the at least one button of the at least one control member;

the method further comprising comprises the following successive steps:

a) the electronic unit processing signals received from the at least one control member and causing the actuator to execute an order associated with a press on the at least one button;

b) the electronic unit identifying an initial button of the predetermined press sequence; and c) the electronic unit comparing the pressed button with the initial button;

wherein if the result of the comparison of step c) is positive, the method includes the following successive steps:

d) the electronic unit accesses a memory storing information relating to the predetermined press sequence;

e) the electronic unit identifies a following button to be pressed in the predetermined press sequence;

f) on receiving a signal the electronic unit causes the actuator to execute an order associated with a button that corresponds to the received signal on being pressed;

g) the electronic unit compares the pressed button with the following button; and h) if the result of the comparison in step g) is positive, the electronic unit compares whether the following button identified during step e) matches a final button of the predetermined press sequence;

wherein steps d) and e) are reproduced so long as the result of the comparison in step g) is positive and the result of the comparison in step h) is negative; and wherein the electronic unit switches to the training mode when the result of the comparison of step h) is positive; and wherein, during execution of the predetermined press sequence, the electronic unit causes the actuator to start a movement or to cease to move as a function of at least one signal received from the at least one control member.

10. The method according to claim 9, wherein, if the result of the comparison of either of the steps c) or g) is negative, then the electronic unit passes to a waiting state from which it executes steps a) to c) on receiving a signal from the at least one control member.

11. The method according to claim 9, including a step for verifying whether a duration of the execution of the predetermined press sequence is less than a threshold value, and if the result of the verification is negative, then the electronic unit passes to a waiting state from which it executes steps a) to c) on receiving a signal from the at least one control member.

12. The method according to claim 9, including a step of verifying whether a duration of a button pressing during the predetermined press sequence has a value greater than a first threshold value and less than a second threshold value, and if the result of the verification is negative, then the electronic unit passes to a waiting state from which it executes steps a) to c) on receiving a signal from the at least one control member.

13. The method according to claim 9, wherein, when the electronic unit switches to training mode, return information is sent to a user in visual or audible form.

14. The method according to claim 9, wherein, when the electronic unit has switched to training mode, recording a predetermined press sequence, enabling the electronic unit subsequently to switch to the training mode, the recorded predetermined press sequence being recorded by activating the at least one button of the at least one control member.

15. The method according to claim 9, wherein, during execution of the predetermined press sequence, a press on the at least one button of the at least one control member causes the electronic unit to change the state of the actuator in the same manner as when the at least one control member is used for controlling the drive system in a normal operation.

16. The method according to claim 9, wherein the predetermined press sequence on the at least one button of the at least one control member does not cause the screen to reach a particular position prior to switching the electronic unit to the training mode.

17. The method according to claim 9, wherein when the at least one control member is provided with a plurality of buttons, at least one signal resulting from pressing on one of the buttons during the predetermined press sequence is not taken into account by the electronic unit as forming part of the series of control signals giving rise to the electronic unit switching to the training mode.

* * * * *

UNITED STATES PATENT AND TRADEMARK OFFICE
CERTIFICATE OF CORRECTION

| | | |
|---|---|---|
| PATENT NO. | : 8,073,569 B2 | Page 1 of 1 |
| APPLICATION NO. | : 12/213674 | |
| DATED | : December 6, 2011 | |
| INVENTOR(S) | : Decroix et al. | |

It is certified that error appears in the above-identified patent and that said Letters Patent is hereby corrected as shown below:

On title page item (12) and (75)

The name of the first-listed inventor should read "Christophe Decroix."

Signed and Sealed this
Thirty-first Day of January, 2012

David J. Kappos
*Director of the United States Patent and Trademark Office*